Figure 1:
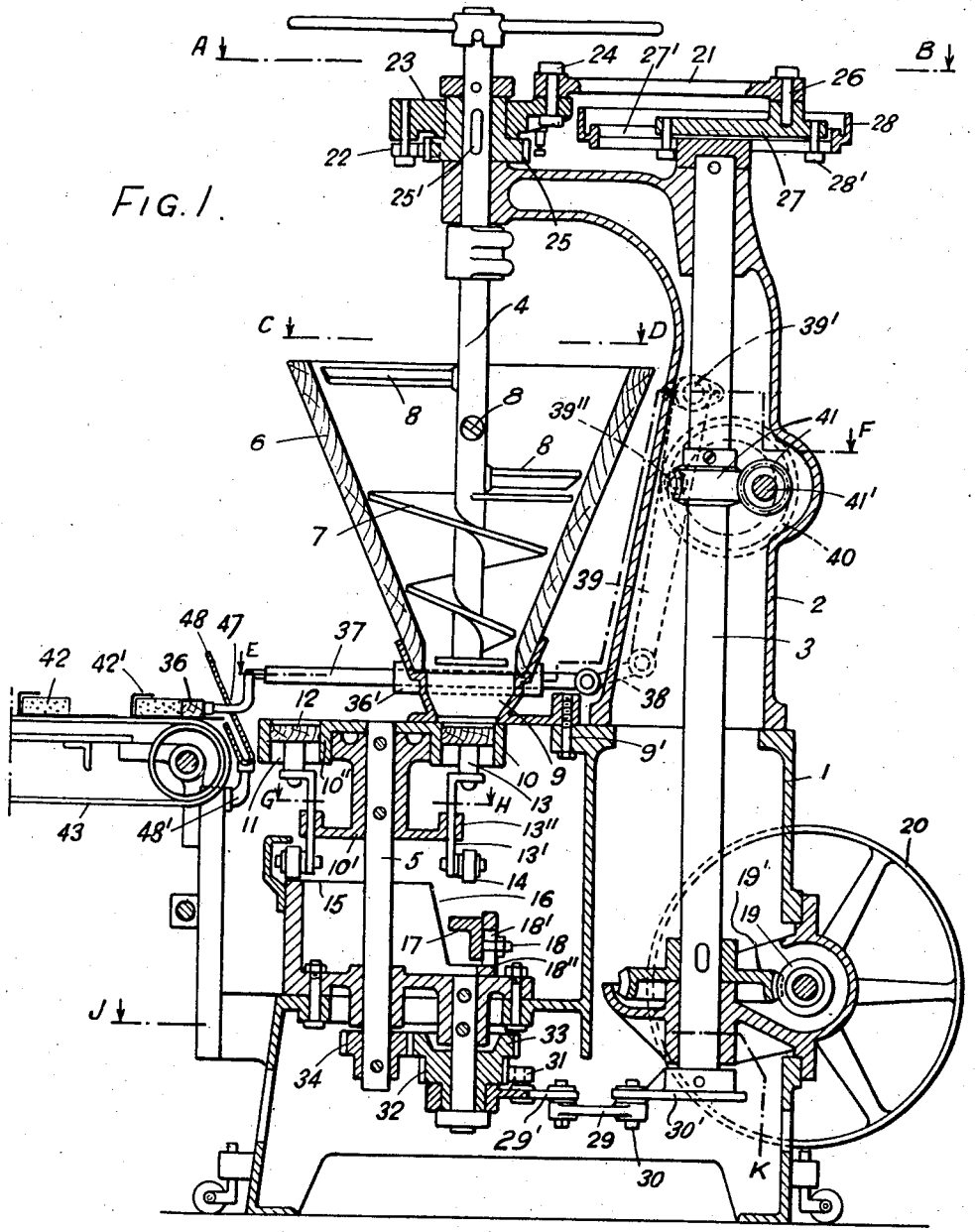

Aug. 13, 1940.  J. BENZ  2,211,638
APPARATUS FOR MOLDING AND OTHERWISE HANDLING PLASTIC MATERIAL
Filed April 2, 1937  2 Sheets-Sheet 1

INVENTOR
Johannes Benz
BY
Norris & Bateman
ATTORNEYS

Aug. 13, 1940.   J. BENZ   2,211,638
APPARATUS FOR MOLDING AND OTHERWISE HANDLING PLASTIC MATERIAL
Filed April 2, 1937   2 Sheets-Sheet 2
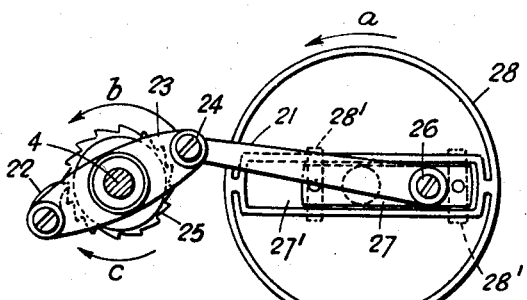
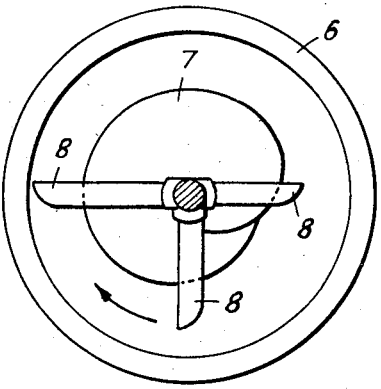
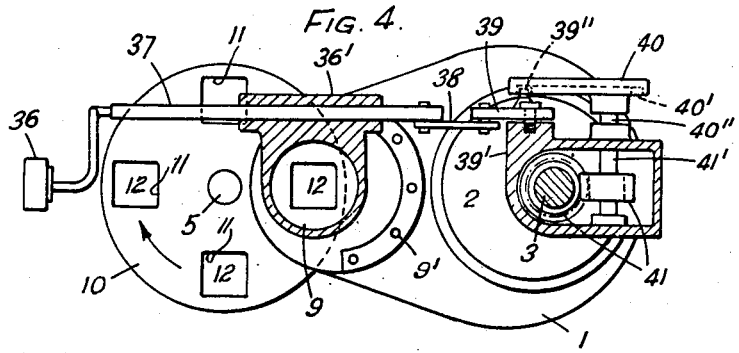
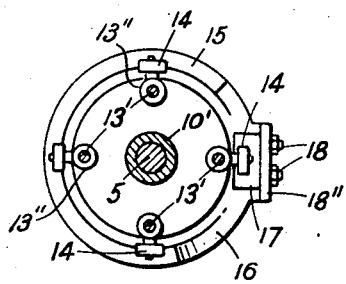
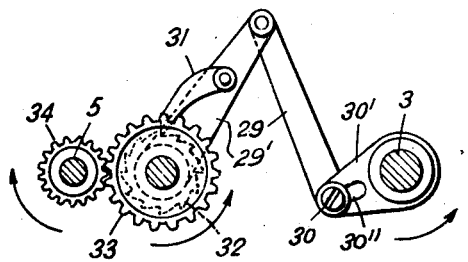
INVENTOR
Johannes Benz
BY
Norris & Bateman
ATTORNEYS Patented Aug. 13, 1940

2,211,638

UNITED STATES PATENT OFFICE 2,211,638

APPARATUS FOR MOLDING AND OTHERWISE HANDLING PLASTIC MATERIAL

Johannes Benz, Dusseldorf, Germany

Application April 2, 1937, Serial No. 134,628
In Germany April 7, 1936

7 Claims. (Cl. 31—42)

This invention relates to apparatus which is adapted to mold and otherwise handle plastic material, for example, butter.

One of the objects of the invention is to provide a machine which, as compared with known machines, is characterised by its simplicity of construction and the ease with which it is maintained in efficient working condition. A further object is to produce a machine in which the working parts can be easily cleaned. A still further object is to produce a machine having a worm to advance material in a hopper and a rotating member which carries a molding chamber in which the mechanism for producing the necessary movements of these parts is easily adjustable. A still further object is to produce a machine of the kind referred to which is capable of being worked to provide a large output.

In a machine embodying the invention there is provided a more or less vertical charging hopper in which a short worm for conveying, say, butter is situated, while obliquely mounted propeller knife blades are provided for packing together the butter, introduced into the charging hopper, to a suitable consistency.

The outlet end of the hopper is located above a table which carries a number of butter molding chambers and which is mounted on a shaft in such manner that when the table is intermittently rotated, one or other of the butter molding chambers is located at the outlet of the hopper.

A plunger for removing the mass of butter forms the base of each molding chamber and the various plungers are suitably actuated, for example, by a guide on which rollers attached to or otherwise connected with the plungers are adapted to ride.

The shafts of the short worm and of the table carrying the molding chambers can be driven by a main driving shaft, parallel to the first-mentioned shafts, which is coupled by means of a transmission gear with the power motor which drives the machine.

The motion of the main shaft is then transmitted intermittently to the shafts carrying the worm and the table by a suitable known pawl and ratchet mechanism.

After a portion of butter has been molded, it is pushed out of the mold whence it can be moved on to a belt conveyer which conveys it to a packing station. The molded butter may be packed by hand, or the packing may be done either wholly or partly automatically.

If the packing is semi-automatic the molded butter is removed from the table carrying the molding chamber on to the belt conveyer, together with packing paper, which is placed by hand in a frame located in the path of the butter. In the plane of the conveyer belt devices are arranged which wrap the paper in a tubular fashion round the molded butter, utilising the motion of the butter for this purpose. The molded butter so wrapped is conveyed to a work table, where the wrapping may be completed by folding the paper at each side.

The invention is illustrated by the accompanying drawings, in which—

Fig. 1 is a longitudinal section through a butter molding machine.

Fig. 2 is a section on the line A—B of Fig. 1.
Fig. 3 is a section on the line C—D of Fig. 1.
Fig. 4 is a section on the line E—F of Fig. 1.
Fig. 5 is a section on the line G—H of Fig. 1, and
Fig. 6 is a section on the line J—K of Fig. 1.

The base 1 of the machine supports a column 2. The base 1 and the column 2 form a hollow housing for the driving shaft 3 and also carry the shafts 4 and 5 all of which shafts are vertical. The shaft 4 carries at its lower end the short worm 7 situated in the charging hopper 6, for conveying the butter into the molding chambers. Above the short worm 7 the shaft 4 carries propeller knife-blades 8 which are inclined about their longitudinal axes and serve to comminute and pre-compress the butter. The butter is then taken up by the short worm 7 and introduced with a minimum of cavities into the molding chamber. The hopper 6 is supported by means of the mouthpiece 9 which is held by screws 9' on the base 1 of the machine.

Fixed to the shaft 5 is a sleeve 10' on which fits the flange 10" of a table 10 which is provided preferably with four molding chambers 11. Inside the molding chambers 11 are located the plungers 12 forming the bases of the molding chambers. The stems 13 are fixed to brackets 13' on which are mounted rollers 14. The brackets 13' can slide vertically in projections 13" of the sleeve 10', so that the rollers 14 can bear on a guide 15. The guide 15 has a recess 16. In the recessed part 16 of the guide 15 there is arranged an angle iron 17 having bolts 18 which are passed through slots 18' in a flange 18" of the guide member 15. By loosening and tightening the nuts of the bolts 18 it is possible to adjust the height of the angle iron 17. The angle iron 17, as hereinafter described, forms a stop for the guide rollers 14 which determines the downward movement of the plunger 12 of the molding chamber 11 under the mouth-piece 9. The adjustment of the height of the angle iron 17 thus determines the weight of the molded piece of butter.

The shaft 3 is driven through a worm 19 and worm wheel 19' constituting a gearing of known type by a belt pulley 20 which in its turn is driven from a power source in obvious manner. The rotation of the main shaft 3 is transmitted intermittently, by means of a connecting rod 21, to the shaft 4. The intermittent motion of the shaft 4 is effected by means of the connecting rod 21 through a pawl 22, of which the lever arm 23 is actuated by the connecting rod 21 by a pin 24. The pawl 22 actuates directly a ratchet wheel 25 which is fixed on the shaft 4 by a key 25'.

The nature, that is the hardness, of the mass of butter introduced determines the amount of rotation desirable for the worm 7 at each stroke. For regulating the stroke the pin 26 of the connecting rod 21 is mounted on a shoe 27. The shoe 27 is located in a recess 27' of a plate 28 fixed to the shaft 3 and is fixed in any desired position by screws 28'.

The rotation of the driving shaft 3 is likewise transmitted intermittently by a linkage 29, 29' to the shaft 5 of the table 10 carrying the molding chambers. The link 29 has a pin 30 which turns in a bearing in the eccentric 30'. As the intermittent movements of the rotary table 10 must always be in synchrony with those of the shaft 4, the bearing of the pivot pin 30 is formed as an elongated slot 30'' (Fig. 6) so that it is possible to adjust the eccentricity of the pin 30. The link 29' transmits its movements intermittently by means of a pawl 31 and a ratchet wheel 32 to the shaft 5. The ratchet wheel 32 is integral with a gear wheel 33 which meshes with a gear wheel 34 keyed to the shaft 5.

By means of the transmission mechanism 33, 34 it is possible for the amount of rotation of the shaft 5 to be regulated in accordance with the requirements. If the table 10 has four molding chambers 11 the shaft 5 must carry out one-quarter of a revolution at each stroke.

The pieces of butter are removed from the plunger 12 of the molding chamber 11 by means of a scraper 36 made, for instance, of wood. The scraper 36 is actuated by a rod 37 guided in a bearing 36' and coupled with a lever arm 39 by a link 38. The lever arm is provided with a roller 39'' and is rotatably mounted on a bearing 39'. At the side of the arm 39 there is mounted on a shaft 41' an eccentric 40 having a groove 40'. In this groove 40' there engages the roller 39'' of the arm 39. The eccentric 40 is driven by a worm and worm wheel gearing 41 of which the worm is mounted on the shaft 3 and the worm wheel on the shaft 41' of the eccentric 40. The rotation of the eccentric 40 causes the arm 39 to turn about its bearing 39'. These movements are transmitted by the link 38 to the rod 37 and the pusher 36 so that the latter, after every working stroke of the worm 7 moves over the plunger of the butter mold 11 shown on the left-hand side of the drawing, whereby the piece of molded butter located on the plunger 12 is removed, for example, to the packing device. Fig. 1 shows the position of the scraper 36 when it has just thrust the butter through the window 47 in a frame 48 which is mounted on a bracket 48' and carries a piece of wrapping paper. After taking up the wrapping paper the piece of molded butter 42 arrives on a conveyer belt 43.

The mode of operation of the described machine is as follows:

The short worm 7 driven intermittently by the shaft 3 through the connecting rod 21, feeds the mass of butter, introduced into the hopper 6 and subjected to preliminary compression by the inclined knife-blades 8, into the mouthpiece 9 of the hopper 6, and presses it against the plunger 12 of the molding chamber 11 located at the right-hand side of Fig. 1. The plunger 12 is thereby moved downwards under the pressure of the butter until the roller 14 strikes against the abutment 17 adjusted to the appropriate height. Thus the molding chamber 11 is completely filled. After the molding chamber 11 under the hopper 6 has been filled, the connecting rod 29 turns the table 10 through a quarter of a revolution. During this movement of the table 10, the roller 14 of the plunger 12 runs on the guide 15 and is moved upwardly thereby (see the right-hand molding chamber shown in Fig. 1). Owing to the upward movement of the plunger 12, the molded piece of butter 42 is now outside the molding chamber. After the rotation of the table has brought the molded piece 42 in front of the pusher 36, the pusher is actuated by the eccentric 40, by means of its cam groove 40' and the roller 39'' which cause the arm 39 to swing to the right into the position shown in Fig. 1, whereupon the link 38 transmits the movement of the arm 39 to the rod 37 and to the pusher 36. The latter thrusts the piece of butter through the window 47 of the paper holder 48 and the piece of butter carries with it a piece of wrapping paper.

I claim:

1. In a butter shaping machine having a charging hopper and at least one molding chamber, the provision of a vertical frame, a main driving shaft mounted in said frame, a parallel shaft within the charging hopper and carrying butter packing means, a molding chamber supporting shaft parallel to the main shaft, crank driving means respectively arranged to transmit the motion of the main shaft to the two last-mentioned shafts and means for intermittently coupling the respective crank driving means with the last-mentioned shafts, means for adjusting the throw of the crank driving means rotating the shaft in the hopper, and pawl and ratchet means respectively coupling the respective crank driving means to the two last-mentioned shafts.

2. A butter shaping machine comprising a substantially vertical charging hopper, at least one molding chamber, means for moving each said molding chamber alternately to and from the mouth of the charging hopper, a shaft in the charging hopper having a worm on its lower end adjacent to the mouth of said hopper, propeller knife blades mounted on said shaft above the worm, and intermittently operating means for rotating said shaft when a chamber is stationary at the mouth of said hopper.

3. A butter shaping machine comprising a substantially vertical charging hopper, at least one molding chamber, a plunger movable in each said chamber and providing a base therefor, means for moving each said molding chamber in turn alternately to and from the mouth of said hopper, a cam follower on each said plunger adapted to bear on a cam surface to co-operate therewith and raise the plunger when the said chamber is moved away from said mouth and to become ineffective to raise the plunger when said chamber is moved underneath said mouth, a shaft in the charging hopper having a worm on its lower end adjacent to the mouth of said hopper, propeller knife blades mounted on said shaft above the worm, and intermittently operating means for rotating said shaft when a chamber is stationary at the mouth of said hopper.

4. A butter shaping machine as set forth in claim 3, which comprises an adjustable cam surface to limit the downward movement of the plunger when said molding chamber moves under the mouth of the charging hopper.

5. A butter shaping machine as set forth in claim 3, in which the upper face of the base of each said molding chamber is made of a hygroscopic material.

6. The combination in a butter shaping machine of a charging hopper, at least one molding chamber, a plunger in each said chamber and providing a base therefor, means for moving each said molding chamber in turn alternately to and from the charging hopper, means for raising each said plunger in each molding chamber to remove molded butter therefrom, a main driving shaft for driving the machine, pushing means, and an eccentric driven by the main driving shaft and coupled to said pushing means by links to operate the pushing means to push said molded butter from said plunger.

7. A butter molding machine comprising a main driving shaft, a substantially vertical charging hopper, a shaft within the charging hopper having a worm on its lower end, propeller knife blades inclined about their longitudinal axes and mounted on said shaft above the worm, an eccentric arranged to be driven by the main driving shaft and having a pin, means for adjusting the eccentricity of the pin on the eccentric, a pawl, a ratchet engaging said pawl and arranged to drive the shaft within the charging hopper, a rod connecting the said pin and the pawl to transmit the rotation of the main shaft intermittently to the shaft within the charging hopper, a third shaft, at least one butter molding chamber mounted eccentrically on said third shaft, a second eccentric arranged to be driven by the main shaft, a pin on said second crank, means for adjusting the eccentricity of said pin on said second eccentric, a second pawl, a ratchet arranged to drive said third shaft, and a rod connecting the pin on said second shaft to said second pawl to transmit the rotation of said main shaft intermittently to said third shaft to move said molding chamber alternately under and away from the mouth of the charging hopper.

JOHANNES BENZ.